United States Patent
Kovacs et al.

(10) Patent No.: US 10,299,470 B2
(45) Date of Patent: May 28, 2019

(54) WINDOW FLY TRAP

(75) Inventors: Ervin Kovacs, Vancouver (CA); Alan L. Vaudry, Victoria (CA); Mark L. Foster, Victoria (CA); John H. Borden, Burnaby (CA)

(73) Assignee: OMS INVESTMENTS, INC., Los Angeles, CA (US)

( * ) Notice: Subject to any disclaimer, the term of this patent is extended or adjusted under 35 U.S.C. 154(b) by 0 days.

(21) Appl. No.: 13/063,644

(22) PCT Filed: Sep. 10, 2009
(Under 37 CFR 1.47)

(86) PCT No.: PCT/CA2009/001272
§ 371 (c)(1),
(2), (4) Date: Jul. 28, 2011

(87) PCT Pub. No.: WO2010/028499
PCT Pub. Date: Mar. 18, 2010

(65) Prior Publication Data
US 2012/0324779 A1    Dec. 27, 2012

Related U.S. Application Data

(60) Provisional application No. 61/096,734, filed on Sep. 12, 2008.

(51) Int. Cl.
*A01M 1/14* (2006.01)
*A01M 1/24* (2006.01)

(52) U.S. Cl.
CPC .............. *A01M 1/14* (2013.01); *A01M 1/145* (2013.01); *A01M 1/24* (2013.01)

(58) Field of Classification Search
CPC .......... A01M 1/14; A01M 1/145; A01M 1/24
(Continued)

(56) References Cited

U.S. PATENT DOCUMENTS 783,211 A * 2/1905 Maddux .................. A01M 1/14
                                                43/115
786,571 A * 4/1905 Laube ............................ 43/115
(Continued)

FOREIGN PATENT DOCUMENTS

WO        9707673 A1    3/1997
WO     2005048703 A1    6/2005

*Primary Examiner* — Darren W Ark
*Assistant Examiner* — Brady W Frazier
(74) *Attorney, Agent, or Firm* — Ulmer & Berne LLP

(57) ABSTRACT

This invention relates to fly traps and specifically a window mounted fly trap which allows flies to enter from below or above and which has an internal barrier to prevent passage upward or downward through the trap. A window mounted fly trap comprising: (a) a frame for mounting to a window surface by detachable window mounting means; (b) a resilient cover having a non-adhesive first surface facing to the exterior of the frame and an adhesive second fly capture surface within the interior of the frame; said frame and cover defining therein a fly capture chamber; (c) the capture chamber having at least one ingress slot for permitting flies to enter the chamber; (d) wherein the flies walking on the surface of said window are permitted to enter the capture chamber and whereby the flies, when attempting to fly, contact the fly capture adhesive and are captured by said capture surface.

22 Claims, 4 Drawing Sheets

(58) Field of Classification Search
USPC ........ 43/107, 114, 115, 116, 119, 124, 132.1
See application file for complete search history.

(56) References Cited

U.S. PATENT DOCUMENTS

| | | | | |
|---|---|---|---|---|
| 944,994 A | * | 12/1909 | Laube | 43/115 |
| 945,003 A | * | 12/1909 | Laube | 43/115 |
| 1,494,493 A | * | 5/1924 | Lichtenberger | A01M 1/14 43/115 |
| 1,584,529 A | * | 5/1926 | Gregory | A01M 1/16 43/119 |
| 4,031,654 A | * | 6/1977 | Gray | A01M 1/02 43/114 |
| 4,044,494 A | * | 8/1977 | Grajnert | 43/119 |
| 4,048,747 A | * | 9/1977 | Shanahan | A01M 1/02 43/114 |
| 4,709,504 A | * | 12/1987 | Andric | 43/114 |
| 4,829,702 A | | 5/1989 | Silvandersson | |
| 4,876,822 A | * | 10/1989 | White | A01M 1/145 43/113 |
| 5,022,179 A | * | 6/1991 | Olson | A01M 1/14 43/114 |
| 5,239,771 A | * | 8/1993 | Beardsley | 43/119 |
| 5,588,250 A | * | 12/1996 | Chiba et al. | 43/114 |
| 5,649,385 A | | 7/1997 | Acevedo | |
| 5,651,211 A | * | 7/1997 | Regan | A01M 1/145 43/113 |
| 5,815,981 A | * | 10/1998 | Dowling | A01M 1/14 43/114 |
| 6,164,009 A | | 12/2000 | Clarke | |
| 6,463,693 B1 | * | 10/2002 | Weisner | A01M 1/04 43/119 |
| 7,748,159 B1 | * | 7/2010 | Wenner | A01M 1/145 43/114 |
| 2003/0070347 A1 | * | 4/2003 | Lingren | A01M 1/14 43/114 |
| 2003/0208949 A1 | * | 11/2003 | Nelson et al. | 43/58 |
| 2004/0020104 A1 | * | 2/2004 | Feldhege | A01M 1/02 43/114 |
| 2005/0005503 A1 | | 1/2005 | Bragg | |
| 2005/0102889 A1 | * | 5/2005 | Hoyes | A01M 1/026 43/114 |
| 2005/0126069 A1 | | 6/2005 | Taylor et al. | |
| 2007/0068066 A1 | * | 3/2007 | Reatti | A01M 1/14 43/114 |
| 2009/0139155 A1 | * | 6/2009 | Kelders | A01M 1/145 52/101 |

* cited by examiner

WINDOW FLY TRAP

CROSS REFERENCE TO RELATED APPLICATIONS

This is a continuation of PCT application No. PCT/CA2009/001272, entitled "WINDOW FLY TRAP", filed Sep. 10, 2010, which claims the benefit of U.S. Provisional Application Ser. No. 61/096,734, each of which is incorporated herein by reference.

FIELD OF THE INVENTION

This invention relates to fly traps and specifically a fly trap which is mounted on a window and allows flies to enter the trap from below or above the trap.

BACKGROUND OF THE INVENTION

The common house fly and related pests are annoying and present a health hazard when flying around a person's food, or garbage, or when landing on a meal of exposed food to be eaten by a person. Because they have sponging mouthparts, house flies cannot bite humans. However, they have been demonstrated to mechanically transmit the causative agents of diarrhea, cholera, yaws, dysentery, and eye infections. Flies are also implicated as mechanical vectors of *Shigella* and *Salmonella*, the latter being a pathogen responsible for food poisoning.

There are many devices available to combat flies such as a fly swatter, an adhesive fly strip and chemical spray.

U.S. Patent Application 2005/0005503, Bragg, shows a hanging fly trap in the form of an artificial plant basket. This device must be hung out of sight and so some effort is needed to monitor the number of flies caught by the trap and then retrieve the trap for cleaning and replacement of adhesive surfaces.

U.S. Patent Application 2005/0126069, Taylor and Lambert, discloses an ornate household fly trap which relies upon ultraviolet light to attract the insect and an adhesive surface to catch it. This device uses a power source and is very complex. It is therefore expensive to manufacture and the purchase price to a consumer is high.

There is a need for a simple, safe and visually attractive fly trap that can be manufactured and sold inexpensively, and does not rely upon pheromones and UV light sources for effectiveness.

SUMMARY OF THE INVENTION

A window mounted fly trap comprising: a frame for mounting to a window surface by window detachable mounting means; a cover having a non-adhesive first surface facing away from the frame and an adhesive second fly capture surface facing to the interior of the frame; said frame and cover defining therein a fly capture chamber; and at least one ingress opening in the frame for permitting flies to enter the chamber.

The frame can include a mid-member, the frame, cover and mid-member in combination forming two fly capture chambers, with fly ingresses into each capture chamber. The trap can include a first and a second wall preventing flies from leaving the capture chamber.

The cover can be resilient and disposable. The window mounting means can comprise at least one suction cup mounted to the mid-member for releasably adhering to the window.

The cover can be releasably secured to the frame by at least one peg. The cover can include at least one projecting tab which can assist in removal of the cover from the frame.

The frame can include a first wall and a second opposite wall, and a first insect ingress on one side of the frame between the first and second walls and a second insect ingress opposite the first ingress between the first and second walls.

The side of the frame and the side of the mid member that are adjacent the cover can have a series of projections thereon. The cover can be transparent or it can have a colour.

DRAWINGS

Exemplary embodiments are illustrated in referenced figures of the drawings. It is intended that the embodiments and figures disclosed herein are to be considered illustrative rather than restrictive.

DETAILED DESCRIPTION OF THE INVENTION

The invention described herein is a window mounted fly trap that relies on natural light as an attractant. The invention takes advantage of two natural habits of the fly: (1) flies are attracted to light; and, (2) over time, after landing on a window, flies tend to completely explore the entire surface of the window. Windows are natural places for flies to congregate because they are attracted to light being transmitted through the window from the opposite side. Therefore, mounting a fly trap on a window increases the chances of catching a fly. Such a window trap is more effective than simply relying upon random flight patterns for catching a fly.

The invention comprises a generally rectangular frame which is releasably mounted on a window using suction cups. This creates a fly catching chamber between the window and the cover of the trap. The two shorter opposite and parallel ends of the frame contact the window and thereby seal the fly catching chamber on two sides against egress of a fly. The two longer opposite and parallel sides of the frame are recessed from the window. When the trap is mounted on the window with the longer sides horizontal, this orientation permits the flies to enter into the capture chamber from above or below as they walk about on the surface of the window glass. The suction cups are mounted to the frame by a frame-bisecting mid-member that prevents flies passing through the trap. On the side of the frame opposite the window, there is temporarily fixed a resilient cover that is coated with a suitable fly catching contact adhesive on its inner surface. The adhesive capture surface faces inwardly in the direction of the window. When the fly encounters the barrier mid-member, it will tend to fly off the window surface and, in doing so, impinge directly onto the adhesive capture surface, whereupon it will be trapped. The resilient cover is fixed to the frame at its corners by mounting pegs located on the outside corners of the frame. Once the adhesive capture surface is covered with flies, it can be removed from the frame and hygienically disposed of. A fresh cover with adhesive surface can be easily re-attached to the frame. When the frame is mounted to a window, it is easy for a person to view the condition of the fly capture surface from the opposite side of the window.

Accordingly, this invention is directed to providing a window mounted fly trap which relies upon the natural instincts of the fly for effectiveness. The fly trap does not rely upon the use of chemicals or artificial attractants. The trap is reusable. The trap is easy to use because the flies are readily trapped and can be hygienically disposed of. The fly trap is inexpensive to manufacture and therefore inexpensive to purchase.

Figure 1:
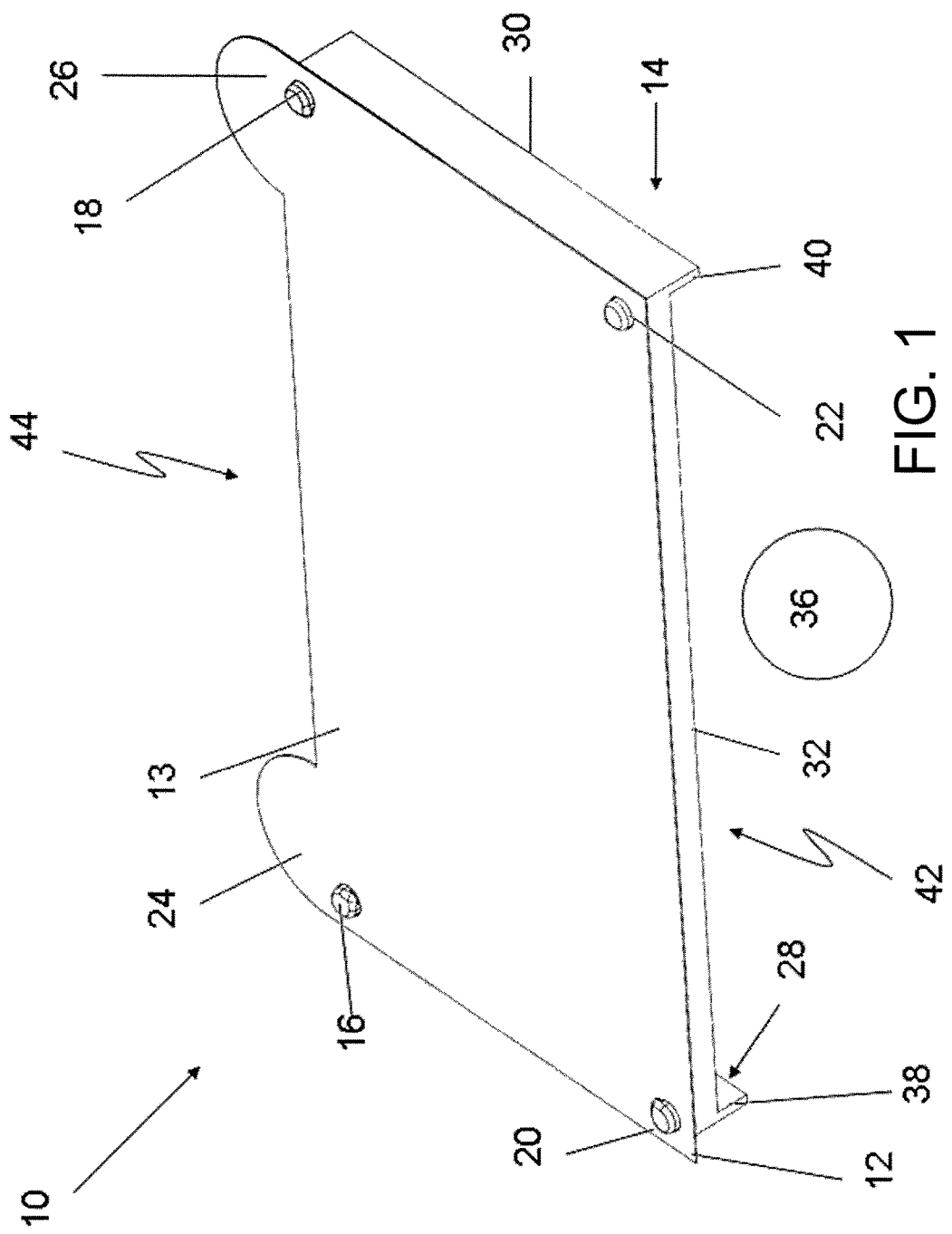
FIG. 1 is a perspective view of the top surface of one embodiment of the window fly trap according to the invention.

FIG. 1 represents a perspective view of the top surface of one embodiment of the window fly trap 10. Specifically, FIG. 1 illustrates a top surface 13 of a cover 12, the exterior surface of which is non-adhesive. The top surface 13 is secured to the top surface of an underlying frame 14 by corner pegs 16, 18, 20 and 22 that protrude above the frame top surface 13. The cover 12 is apertured at its corners to accept the four frame corner pegs 16, 18, 20 and 22. The cover 12 includes at its top corners a first tab 24 and a second tab 26 that permit easy mounting and removal of the cover without the operator having to contact the underlying adhesive bottom surface of the cover 12 or any flies that are attached to it.

The frame 14 is rectangular and comprises a first short side 28 and a second short side 30 which are parallel to one another and a first long side 32 and a second long side 34 (not visible) which are also parallel to one another. The short sides 28 and 30 of the frame 14 are of greater width than the two long sides 32 and 34 and are designed to contact a window surface 36 (shown as a circle) by way of a pair of supporting members 38 and 40. The long sides 32 and 34 of the frame 14 (by being of narrower width) are recessed from the window surface a distance equal to the height of supporting members 38 and 40 so that fly ingress slots 42 and 44 are created between the frame 14 and window 36. These slots 42 and 44 permit flies to enter the trap 10 as they walk about on the surface of the window 36.

Figure 2:
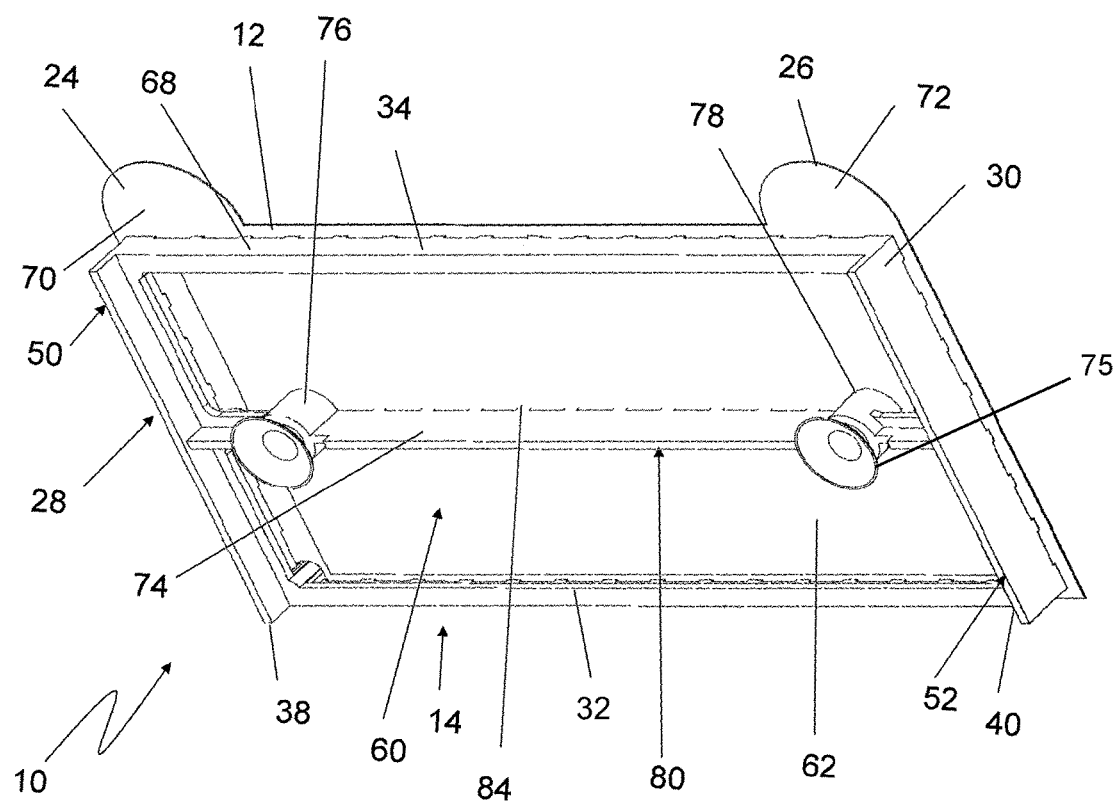
FIG. 2 is a perspective view of the bottom surface of one embodiment of the window fly trap.

FIG. 2 represents a perspective view of the bottom surface of the embodiment of the window fly trap 10 shown in FIG. 1. The frame 14, the parallel short sides 28 and 30, the supporting members 38 and 40 and the parallel long sides 32 and 34 of the frame are clearly visible. The bottom surfaces 50 and 52 of the supporting members 38, 40 are linear and smooth to permit intimate contact with the window surface. The inner surface 62 of the cover 12 is covered with a suitable adhesive that is capable of catching and holding a flying insect but is not toxic or odiferous to humans.

The top surface of the frame 14 includes a series of equally spaced projections 68 around the frame 14, the tops of which contact the adhesive inner surface of the cover 12. Since the tops of the projections 68 provide non-continuous contact with the inner surface 62 of the cover, this permits easy removal and disposal of the cover 12.

The bottom surfaces 70 and 72 of the tabs 24 and 26 extending from the frame 14 are not adhesive so the operator can remove the cover 12 and the pegs 16, 18, 20 and 22 without adhesive contact and without contacting flies that might be trapped on the adhesive bottom surface 62 of the cover 12. It is evident from FIG. 2 that once the flying insect attempts to attain flight, the low profile of the cover 12 and frame 14 encourages the insect to contact the adhesive capture surface 62 of the cover 12 and become trapped.

FIG. 2 represents the view that faces the operator when she or he is on the opposite side of the window. In this way, the operator can easily see when the capture surface 62 of the cover 12 is congested with trapped flies and needs to be exchanged for a fresh cover.

FIG. 2 also shows a mid-member 74 that extends between the two parallel opposite short sides 28, 30 at their mid-point and parallel to the two parallel opposite long members 32, 34. The mid-member 74 bisects the interior of the frame 14 and defines two insect capture chambers 60. The mid-member 74 is adapted to hold two conventional suction cups 75 by way of a pair of mounting collars 76 and 78 located at separate points on the mid-member 74. The suction cups 75 in turn are adapted to releasably mount the frame 14 to the surface of the window 36. The bottom side 80 of the mid-member 74 is of the same height as the two parallel short sides 28, 30 so that flies are impeded from traveling from one capture chamber 60 to the other. The mid-member 74 encourages the fly to take off when it encounters the mid-member 74. The top side 82 of the mid-member 74 also includes a series of projections 84, the tops of which contact the bottom adhesive surface of the cover 12 and maintain it in place. Since only the tops of the projections 68 and 84 contact the sticky side of the cover 12, and thereby avoid continuous contact with the cover 12, they facilitate the operator removing the cover 12 from the frame 14.

Figure 3:
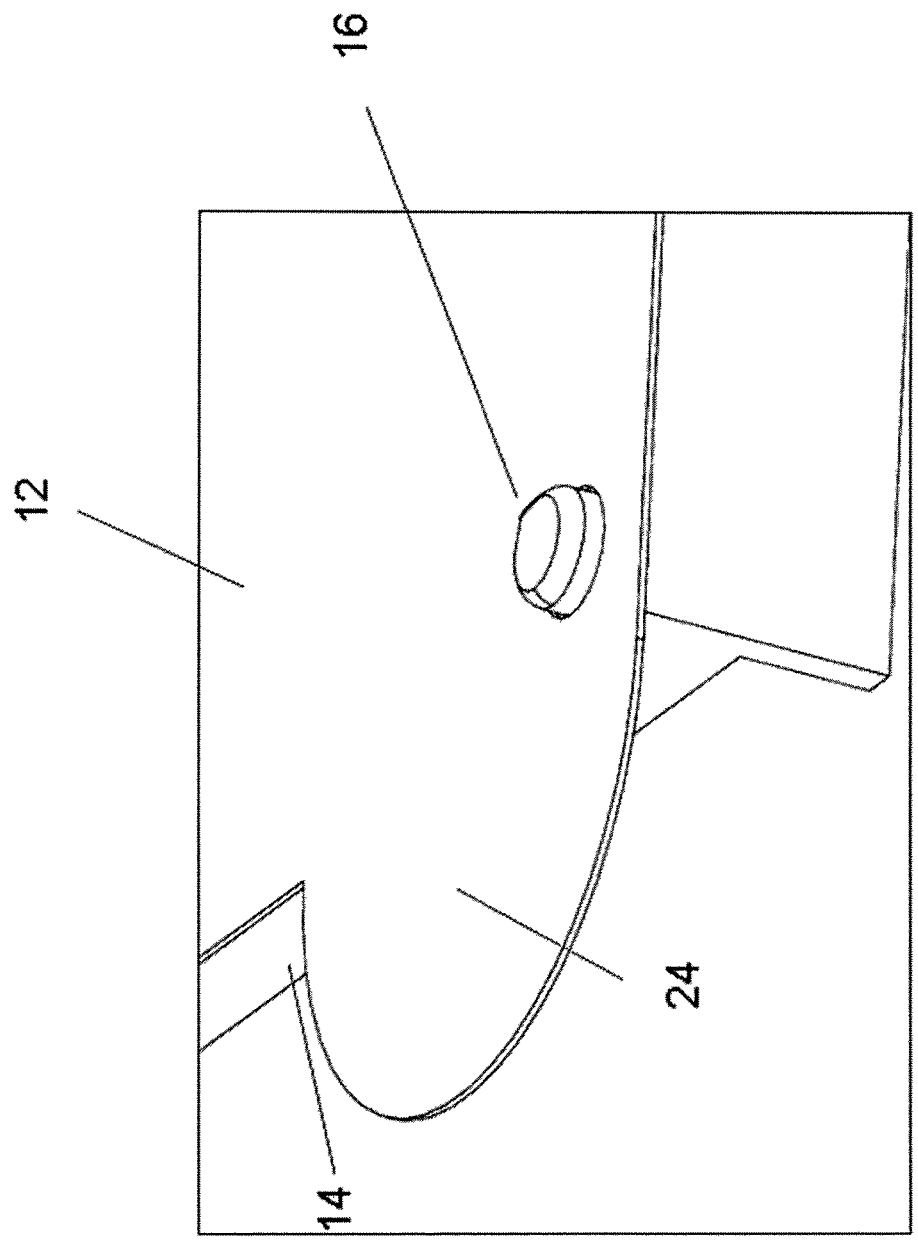
FIG. 3 is a detailed perspective view of a portion of a cover including an attachment tab that fixes the cover to a fly trap frame.

FIG. 3 illustrates a detailed perspective view of part of the frame 14 with a corner peg 16 used to guide the cover 12 onto the top of the frame 14. Tab 24 is shown adjacent to the peg 16. The tab 24 does not have adhesive on either side.

Figure 4:
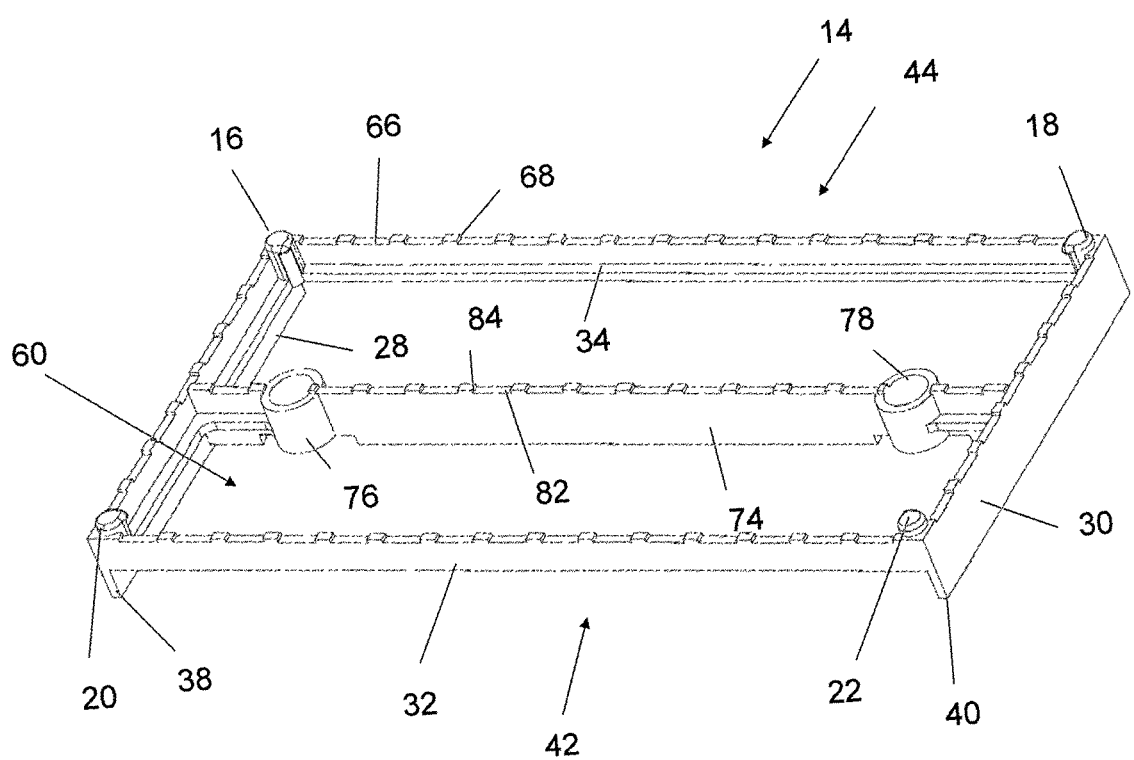
FIG. 4 is a perspective view of the top surface of a frame of one embodiment of the window fly trap.

FIG. 4 illustrates a perspective view of the top of the frame 14 illustrating the four corner pegs 16, 18, 20 and 22. The first and second short sides 28 and 30 of the rectangular frame 14 and the first and second long sides 32 and 34 of the rectangular frame 14 are shown. FIG. 4 also shows the first and second frame supporting members 38 and 40, the first and second ingress slots 42 and 44. FIG. 4 further illustrates the series of upward projections 68 disposed around the periphery of the outer top surface 66 of the frame 14 and the upward projections 84 at the top of the mid-member 74. FIG. 4 also illustrates the pair of capture chambers 60 formed by the frame 14 and the mid-member 74. The mid-member 74 includes first suction cup mounting collar 76 and the second suction cup mounting collar 78.

The cover 12 may be formed from a suitable plastic sheet. The frame 14 may be injection molded from a suitable thermoplastic material as a single piece according to conventional techniques.

EXAMPLE 1

Experimental Evaluation of Prototype Window Fly Traps

Four prototype window fly traps were manufactured according to the design described herein. They were mounted equidistant from each other in a horizontal line on a north-facing window measuring 2.4 m long and 1.2 m high in a room measuring 3×4 m held at approximately 20° C. They were fitted with a clear plastic cover or resilient paper covers, all having adhesive capture surfaces facing toward the window glass. The paper covers were coloured yellow, green or white on the side facing into the room. Placement of the four types of covers on traps was randomized.

House flies (number unknown) were collected in a jar from a large cage in which the flies were reared. The jar was placed in the room, and opened, allowing the flies to be released. The lights were then turned off, and the room was left with the door shut for 24 h. This procedure was repeated four times, with the position of the coloured or clear covers re-randomized for each of the four replicates. At the end of each 24 h period, the number of house flies captured on the sticky surfaces of the covers facing the window adjacent to the top and bottom chambers of each trap were counted. The mean catches for each coloured or clear trapping surface (top and bottom catches combined) were compared by ANOVA followed by Tukey's LSD test ($\alpha=0.05$).

In total of 161 house flies were captured, with 28, 50, 48 and 35 flies respectively captured in the four successive replicates. Of the total captured, 75% were in the bottom chambers of the traps. The mean catches (±SE) for each colour type of cover were: yellow 15.0±4.0, green 11.3±1.9, clear 8.0±3.5 and white 6.0±2.7. There was no significant difference between the mean catches ($F=1.56$, $P=0.25$). At the end of each replicate there were only 1-2 flies left free in the room, unexpectedly indicating that a large majority of the released flies were captured in the traps.

These results clearly demonstrate the efficacy of the window fly trap for capturing house flies inside a building. They also indicate that the colour of the trap cover is of less significance to the flies than the light passing through the glass that draws them to a window. Along with the results of many other experiments not reported herein, the results are sufficiently promising to justify commercialization of the window fly trap.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A window mounted fly trap comprising:
   a. a frame comprising a top surface, a bottom surface disposed on a side of the frame opposite the top surface, and a mount extending from the bottom surface away from the frame, wherein the frame defines an interior and the mount is constructed to detachably mount to a window surface;
   b. a cover attached to the top surface of the frame enclosing the interior at the top surface of the frame, the cover comprising first and second opposing surfaces, the first surface comprising a non-adhesive surface facing away from the interior of the frame, the second surface comprising an adhesive fly capture surface configured to face the window surface, said frame, cover, and window surface defining therein a fly capture chamber; and
   c. at least one ingress in the frame for permitting flies to enter the fly capture chamber, the frame including a mid-member dividing the fly capture chamber into at least a first fly capture chamber including a first fly ingress and a second fly capture chamber including a second fly ingress.

2. The trap of claim 1, wherein the frame and the cover are rectangular.

3. The trap of claim 2, wherein the frame includes a first wall and a second wall that respectively impinge on the window surface to prevent flies from leaving the capture chamber.

4. The trap of claim 1, wherein said cover is resilient.

5. The trap of claim 1, wherein said cover is disposable.

6. The trap of claim 1, wherein said mount comprises at least one suction cup for releasably adhering to the window surface wherein the window surface is glass.

7. The trap of claim 6, wherein the at least one suction cup is mounted to the mid-member for releasably adhering to the window surface.

8. The trap of claim 1, wherein the cover is releasably secured to the frame by at least one peg that fits into a hole in the cover.

9. The trap of claim 1, wherein the cover includes at least one projecting tab which assists in removal of the cover from the frame.

10. The trap of claim 1, wherein the frame includes a first wall and a second opposite wall, and a first insect ingress on one side of the frame between the first and second walls and a second insect ingress opposite the first ingress between the first and second walls.

11. The trap of claim 1, wherein each of a side of the frame and a side of the mid-member adjacent to the cover have a series of projections thereon.

12. The trap of claim 1, wherein the cover is transparent.

13. The trap of claim 1, wherein the cover has a color.

14. The trap of claim 1, wherein the frame includes a first end wall, a second and opposite end wall, a first side wall, a second and opposite side wall, and the mid-member spanning the long axis of the frame from the midpoint of one end wall to midpoint of the other.

15. The trap of claim 14, wherein the top edges of the first and second end walls, the first and second side walls and the mid-member have a series of projections thereon on which the window facing fly capture adhesive surface of the cover rests.

16. The trap of claim 14, wherein the first and second end walls and the mid-member impinge on the window surface, and the first and second side walls are recessed from the window so as to form the first and second ingresses.

17. The trap of claim 16, wherein placing the cover on the frame creates two chambers with ingress openings from which flies walking on the window surface cannot escape except through the ingress openings, and flies that attempt to take off are captured on the window-facing adhesive fly capture surface of the cover.

18. The trap of claim 1, wherein the frame and the mid-member each have top surfaces with a series of equally spaced projections configured to contact the adhesive surface of the cover.

19. The trap of claim 1, wherein two mounting collars are located at separate points along the mid-member for holding the window detachable mounting means.

20. The trap of claim 19, wherein the window detachable mounting means are suction cups which are held by the two mounting collars.

21. A window mounted fly trap comprising:
   a. a frame having a first side, a second side positioned opposite the first side, and a mid-member connected between the first and second sides, the first and second sides each have a first surface and a second surface opposite the first surface;
   b. a mount connected to the frame and constructed to detachably mount the frame to a window surface; and
   c. a cover having a first cover surface, the first cover surface comprising an adhesive fly capture surface, wherein a portion of the first cover surface is adhered to the second surface of the first and second sides;
   d. wherein the frame forms an opening opposite the cover;
   e. wherein the first and second sides, the mid-member, and the cover define a first fly capture chamber including a first fly ingress and a second fly capture chamber including a second fly ingress;

f. wherein the first and second sides each comprise a height such that when the mount detachably mounts the trap to the window surface, the first surface of each of the first and second sides is disposed adjacent to the window surface.

22. The trap of claim 21, wherein the first surface of each of the first and second sides engages the window surface.

* * * * *